(12) United States Patent
Furukawa

(10) Patent No.: US 7,439,900 B2
(45) Date of Patent: Oct. 21, 2008

(54) RADAR SYSTEM WITH RESAMPLING FEATURES

(75) Inventor: Hidetoshi Furukawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 199 days.

(21) Appl. No.: 11/430,055

(22) Filed: May 9, 2006

(65) Prior Publication Data

US 2007/0052579 A1    Mar. 8, 2007

(30) Foreign Application Priority Data

May 18, 2005 (JP) ............................ 2005-145756
Apr. 26, 2006 (JP) ............................ 2006-122178

(51) Int. Cl.
*G01S 13/00* (2006.01)

(52) U.S. Cl. .............................. 342/27; 342/28; 342/95

(58) Field of Classification Search ..................... 342/95
See application file for complete search history.

(56) References Cited

U.S. PATENT DOCUMENTS

| | | | |
|---|---|---|---|
| 3,952,304 A * | 4/1976 | Broniwitz et al. ............. | 342/95 |
| 5,504,487 A | 4/1996 | Tucker | |
| 5,515,300 A | 5/1996 | Pierce | |
| 5,612,700 A | 3/1997 | Tucker | |
| 5,719,580 A * | 2/1998 | Core ........................... | 342/100 |
| 6,765,526 B1 * | 7/2004 | Doerry ........................ | 342/160 |
| 6,792,058 B1 * | 9/2004 | Hershey et al. ............. | 375/347 |
| 2002/0027522 A1 * | 3/2002 | Tullsson ...................... | 342/196 |
| 2002/0126044 A1 * | 9/2002 | Gustafson et al. ....... | 342/357.12 |
| 2003/0210174 A1 * | 11/2003 | Nakamura .................... | 342/70 |
| 2005/0128125 A1 * | 6/2005 | Li et al. ........................ | 342/22 |
| 2005/0165567 A1 * | 7/2005 | Inatsune ...................... | 702/66 |

FOREIGN PATENT DOCUMENTS

| | | |
|---|---|---|
| JP | 2000-275332 | 10/2000 |
| JP | 2001-166034 | 6/2001 |

* cited by examiner

*Primary Examiner*—Thomas H. Tarcza
*Assistant Examiner*—Timothy A Brainard
(74) *Attorney, Agent, or Firm*—Oblon, Spivak, McClelland, Maier & Neustadt, P.C.

(57) ABSTRACT

Disclosed is a radar system which comprises an AD conversion unit for converting an analog signal obtained from an antenna into a digital signal, a frequency analysis unit for performing a frequency analysis of the digital signal converted by the AD conversion unit, a time-frequency analysis unit for performing a time-frequency analysis of the digital signal converted by the AD conversion unit, and a target detection unit for detecting a target based on a signal of which the frequency analysis is performed by the frequency analysis unit and a signal of which the time-frequency analysis is performed by the time-frequency analysis unit.

12 Claims, 9 Drawing Sheets

FIG. 3
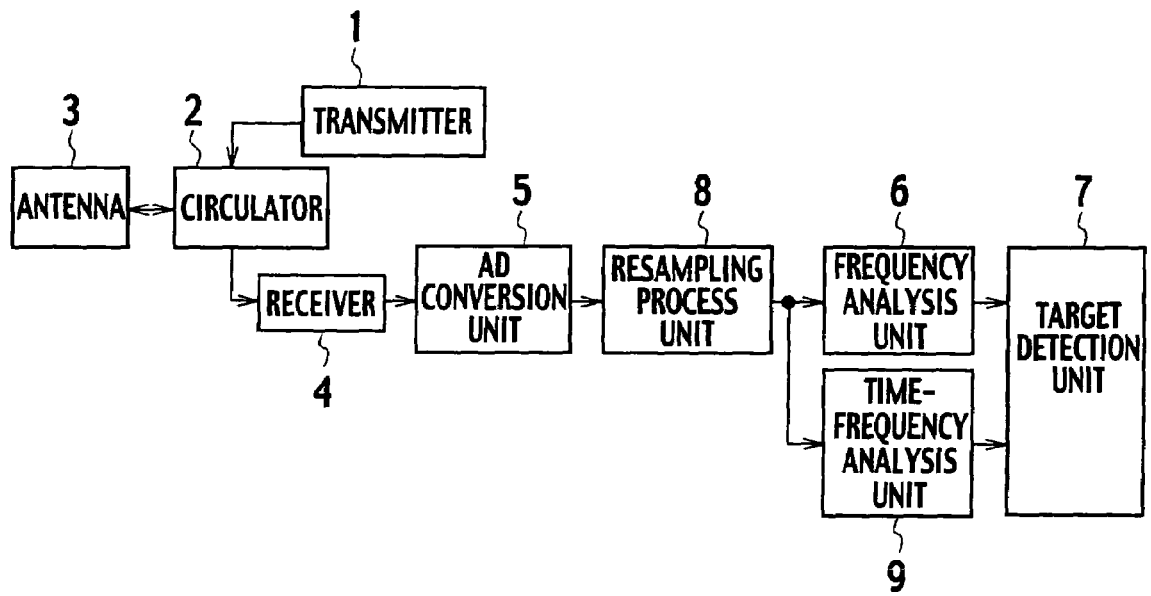
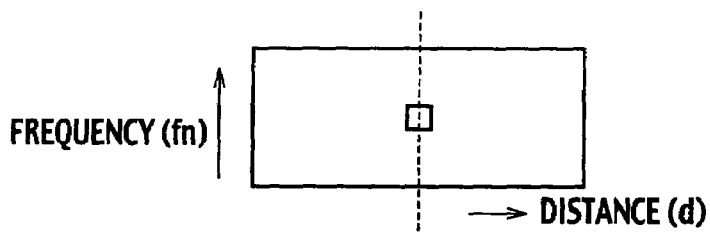
FIG. 4A
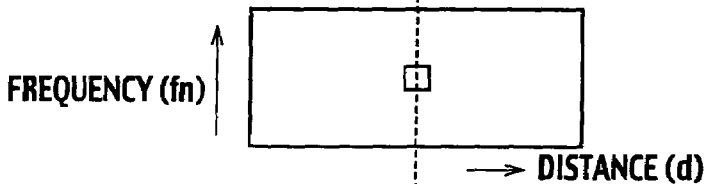
FIG. 4B
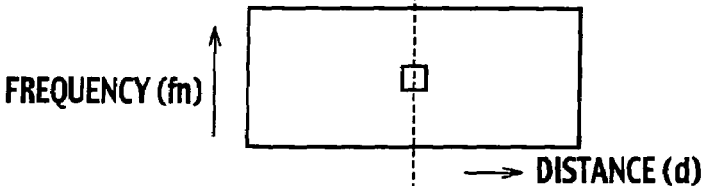
FIG. 4C
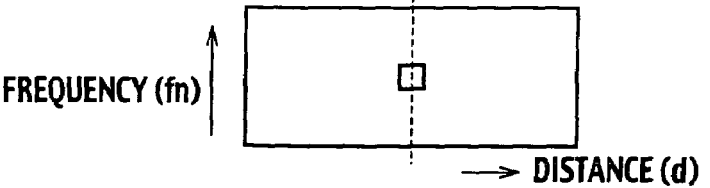
FIG. 4D

RADAR SYSTEM WITH RESAMPLING FEATURES

BACKGROUND OF THE INVENTION

1. Field of the Invention

The present invention relates to a radar system for acquiring, searching, and tracking a small and fast target.

2. Description of the Related Art

A conventional radar system will be described in detail by referring to drawings. FIG. 1 is a block diagram showing a configuration of a conventional radar system. This radar system is configured by having a transmitter 1, a circulator 2, an antenna 3, a receiver 4, an AD conversion unit 5, a frequency analysis unit 6, and a target detection unit 7.

The antenna 3 converts a transmitted signal, which is transmitted from the transmitter 1 through the circulator 2, into a radio wave, and transmits the converted radio wave as a transmitted wave to a space in a designated direction. The antenna 3 receives a reflected wave generated by reflection of the transmitted wave with a target, converts it into an electric signal, and transmits the converted electric signal as a received signal to the receiver 4 through the circulator 2.

The receiver 4 performs frequency conversion of the received signal, which is transmitted from the antenna 3 through the circulator 2, and transmits it to the AD conversion unit 5. The AD conversion unit 5 converts the analog received signal, which is transmitted from the receiver 4, into a digital received signal, and transmits it to the frequency analysis unit 6. The frequency analysis unit 6 performs a frequency analysis of the digital received signal, which is transmitted from the AD conversion unit 5, and transmits a signal indicating a result of the analysis to the target detection unit 7. The target detection unit 7 detects a target based on the signal indicating the result of the analysis, which is transmitted from the frequency analysis unit 6.

To detect a small target with a radar system, there is generally known an effective method in which a pulse hit number is increased to improve a signal-to-noise ratio (SN ratio) by an integration effect of frequency analysis processing. However, in the above-described conventional radar system, in a case where the target is moving at high speed, even when the pulse hit number is set to be large, the integration effect of the frequency analysis processing cannot be obtained since a position of the target gradually moves.

In other words, in a case where movement of the target in an observation time is small, a desired integration effect can be obtained by the processing in the frequency analysis unit 6. However, as the movement of the target in the observation time becomes larger, the integration effect becomes smaller, resulting in that the desired integration effect cannot be obtained. FIG. 2 shows an integration loss in relation to the movement of the target.

It should be noted that related arts are disclosed in Japanese Patent Laid-open Applications No. 2001-166034 and No. 2000-275332.

In Japanese Patent Laid-open Application No. 2001-166034, there is disclosed a target-tracking radar system that can surely perform tracking of a target even when the target is a small and fast target. This target-tracking radar system is provided with an A/D converter which starts sampling a predetermined sampling frequency after a predetermined time has past since a transmitted pulse had started to be transmitted and which converts an analog received signal into a series of digital data, an A/D conversion control unit for controlling to shift a starting time of sampling by a sampling interval corresponding to the moving distance of the target in a case where the moving distance of the target based on target speed data and PRF data exceeds distance resolution based on the sampling frequency, and to generate the series of the digital data in the same order and position as digital data of the received pulses, and an integrator for sequentially integrating respective digital data in the same time zone which is timed since when each transmitted pulse is transmitted.

In addition, in Japanese Patent Laid-open Application No. 2000-275332, there is disclosed a radar system which has a stable pulse compression characteristic and coherent integration performance, even when the Doppler shift is caused by movement of a target, and a range bin extends between pulse hits. This radar system is provided with a plurality of Doppler correction circuits which are different in an amount of Doppler correction, and each performs pulse compression after Doppler correction in the time domain is applied to digital I and Q signals. Further, the radar system corrects respective ranges so as to be the same range bin in a case where amplitude maximum values of the ranges are different between the pulse hits. As a result of the coherent integration, the radar system selects the maximum integration value and outputs it.

As described above, in the conventional radar system, there is a problem which is that a desired integration effect cannot be obtained by frequency analysis processing in a case where a target moves at high speed, and detection probability of a target and accuracy of angle measuring are deteriorated.

In addition, in the target tracking radar system disclosed in Japanese Patent Laid-open Application No. 2001-166034, data in the same time zone is integrated since the starting time of sampling is shifted according to movement of the target. Therefore, even when the target moves at high speed, the desired integration effect can be substantially obtained. There is a problem, however, which is that a false alarm is generated when a signal with large amplitude is entered in addition to the target. Moreover, there is a problem which is that the integration effect cannot be obtained when the moving condition of the target is changed in between times.

Further, in the radar system disclosed in Japanese Patent Laid-open Application No. 2000-275332, the Doppler correction of the pulse compression processing and the range correction of the coherent integration are preformed. However, a large effect cannot be obtained in spite of a large processing load, since a decline of the SN ratio by the pulse compression processing with the Doppler frequency is extremely small in comparison with a decline of integration gain by the movement of the target. In addition, it is not practical in terms of a calculation amount since the range correction is preformed in a brute-force manner.

SUMMARY OF THE INVENTION

An object of the present invention is to provide a radar in which detection probability of a target and accuracy of angle measuring are not deteriorated and false alarms are extremely few, even when a target moves at high speed.

A radar system according to a first aspect of the present invention A radar system includes an AD conversion unit which converts an analog signal obtained from an antenna into a digital signal, a frequency analysis unit which performs a frequency analysis of the digital signal converted by the AD conversion unit, a time-frequency analysis unit which performs a time-frequency analysis of the digital signal converted by the AD conversion unit, and a target detection unit which detects a target based on a signal of which the frequency analysis is performed by the frequency analysis unit and a signal of which the time-frequency analysis is performed by the time-frequency analysis unit.

In addition, a radar system according to a second aspect of the present invention includes a resampling process unit which performs resampling of the digital signal converted by the AD conversion unit. The frequency analysis unit performs a frequency analysis of a signal of which the resampling is performed by the resampling process unit, and the time-frequency analysis unit performs the time-frequency analysis of the signal of which the resampling is performed by the resampling process unit.

The radar system according to the first aspect of the present invention detects the target based on presence/absence of movement or moving speed of the target by using an outputted signal from the time-frequency analysis processing. Therefore, a radar system in which false alarms are extremely few can be provided, even when a target moving at speed other than desired one is present.

In addition, the radar system according to the second aspect of the present invention performs resampling process for correcting the movement of a target, and performs a frequency analysis processing and the time-frequency analysis processing by using the resampled received signal. Therefore, a desired integration effect can be obtained and the target is detected based on presence/absence of movement or moving speed of the target in a signal in which the movement is corrected by using the outputted signal from the time-frequency analysis processing. Accordingly, there can be provided a radar that detection probability of a target and accuracy of angle measuring are not deteriorated and false alarms are extremely few even when the target moves at high speed.

BRIEF DESCRIPTION OF THE DRAWINGS

FIG. 3 is a block diagram showing a configuration of a radar system according to a first embodiment of the present invention.

FIG. 4A is a diagram showing a result of a frequency analysis in relation to a target which is not relatively moving after resampling process in the radar system according to the first embodiment of the present invention. FIGS. 4B to 4D are diagrams for showing a result of a time-frequency analysis in relation to the target which is not relatively moving after the resampling process.

DESCRIPTION OF THE PREFERRED EMBODIMENTS

Figure 1:
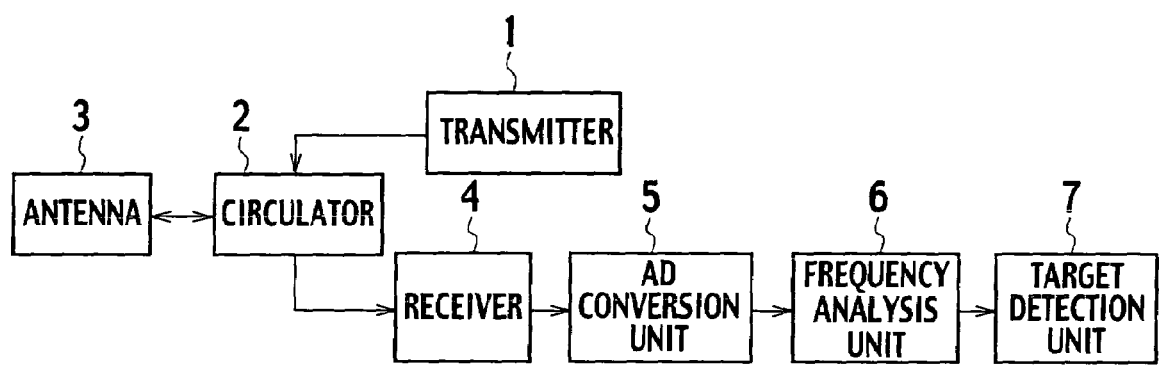
FIG. 1 is a block diagram showing a configuration of a conventional radar system.
Figure 2:
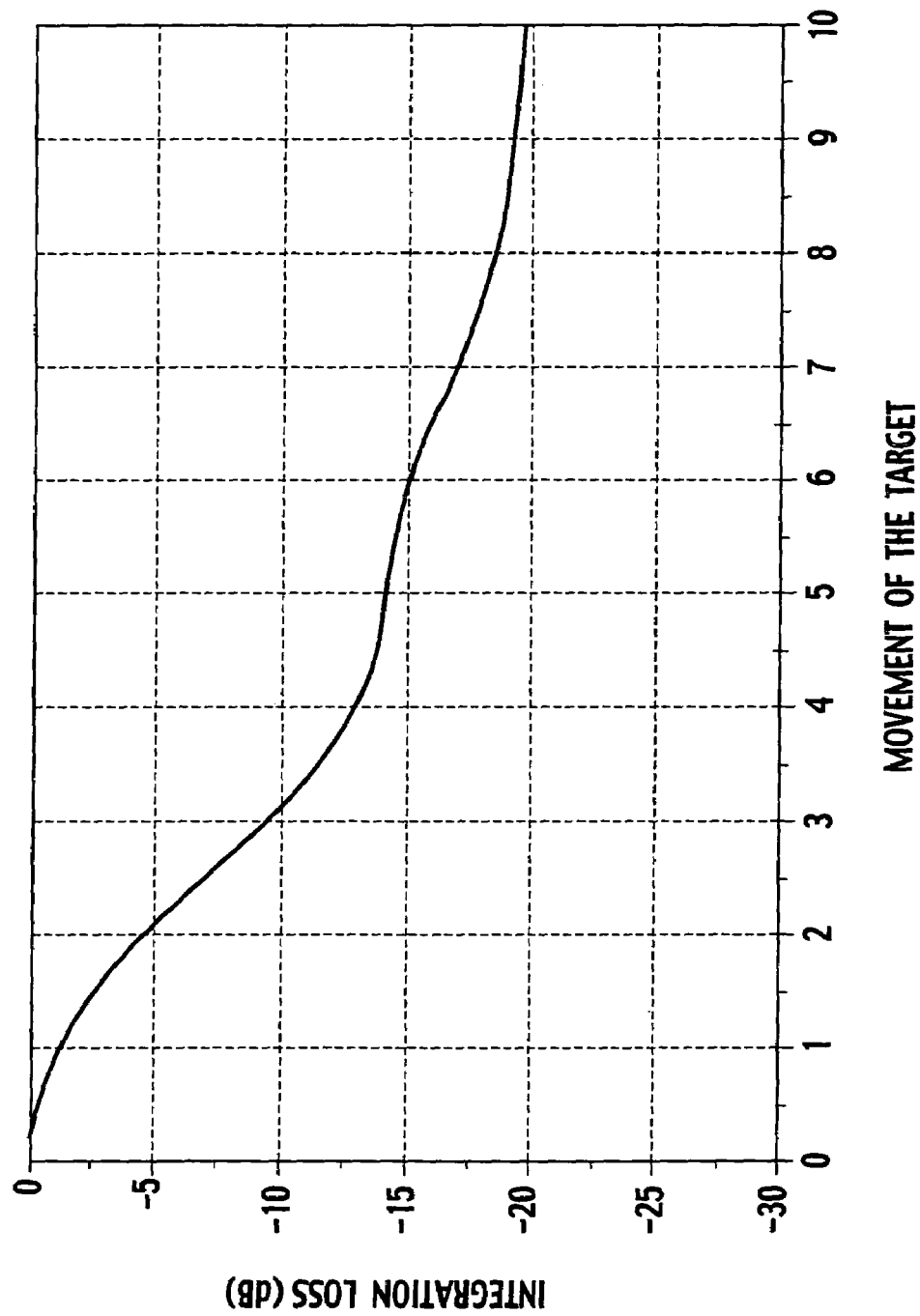
FIG. 2 is a graph for showing an integration loss of the conventional radar system in relation to a movement of a target.

A detailed description of a radar system according to preferred embodiments of the present invention will be given below by referring to drawings. It should be noted that, in the following description, the same reference numerals used in the description of the conventional art are used to denote portions corresponding to the components in the description of the conventional art.

First Embodiment

FIG. 3 is a block diagram showing a configuration of a radar system according to a first embodiment of the present invention. This radar system is configured with a transmitter 1, a circulator 2, an antenna 3, a receiver 4, an AD conversion unit 5, a resampling process unit 8, a frequency analysis unit 6, a time-frequency analysis unit 9, and a target detection unit 7.

The antenna 3 converts a transmitted signal, which is transmitted from the transmitter 1 through the circulator 2, into a radio wave, and transmits the converted radio wave as a transmitted pulse to a space in a designated direction. The antenna 3 receives a reflected wave which is generated by a reflection of the transmitted pulse with a target, converts it into an electric signal, and transmits the converted electric signal as a received signal to the receiver 4 through the circulator 2.

The receiver 4 performs frequency conversion of the received signal, which is transmitted from the antenna 3 through the circulator 2, and transmits it to the AD conversion unit 5. The AD conversion unit 5 converts the analog received signal, which is transmitted from the receiver 4, into a digital received signal, and transmits it to the resampling process unit 8.

The resampling process unit 8 performs resampling of the digital received signal which is transmitted from the AD conversion unit 5. After the movement of the target is corrected with the processing in this resampling process unit 8, the maximum value of each pulse included in the received signal is integrated. Therefore, a desired integration effect can be obtained. An outputted signal from this resampling process unit 8 is transmitted to the frequency analysis unit 6 and the time-frequency analysis unit 9.

The frequency analysis unit 6 performs a frequency analysis of a signal which is transmitted from the resampling process unit 8. The frequency analysis in this frequency analysis unit 6 can be achieved, for example, by DFT (discrete Fourier transform) or FFT (fast Fourier transform). A signal indicating a result of the frequency analysis in the frequency analysis unit 6 is transmitted to the target detection unit 7.

The time-frequency analysis unit 9 performs a time-frequency analysis of the signal which is transmitted from the resampling process unit 8. For example, the signal, which is transmitted from the resampling process unit 8, is a pulse train consisting of forty pulses, and the frequency analysis is performed by dividing this pulse train into three time zones. Specifically, the frequency analysis of twenty pulses from the first to the twentieth pulses, from the eleventh to the thirtieth pluses, and from the twenty first to the fortieth pulses are preformed.

The time-frequency analysis in this time-frequency analysis unit 9 can be achieved by the short-time Fourier transform. A signal indicating a result of the time-frequency analysis obtained in the time-frequency analysis unit 9 is transmitted to the target detection unit 7.

The target detection unit 7 detects the target based on the signals which are transmitted from the frequency analysis unit 6 and the time-frequency analysis unit 9.

FIG. 4A shows a result of the frequency analysis of the target which does not relatively move after the resampling process, and it is formed based on a pulse train of k pulses obtained as a received signal in an observation time. FIGS. 4B to 4D show results of the time-frequency analysis of the target which does not relatively move after the resampling process.

FIG. 4B is formed based on k/2 pulses in the first half of the pulse train of k pulses obtained as the received signal in the observation time. FIG. 4C is formed based on k/2 pulses in the center of the k pulses train. FIG. 4D is formed based on k/2 pulses in the last half of the k pulses train.

Figure 5A:
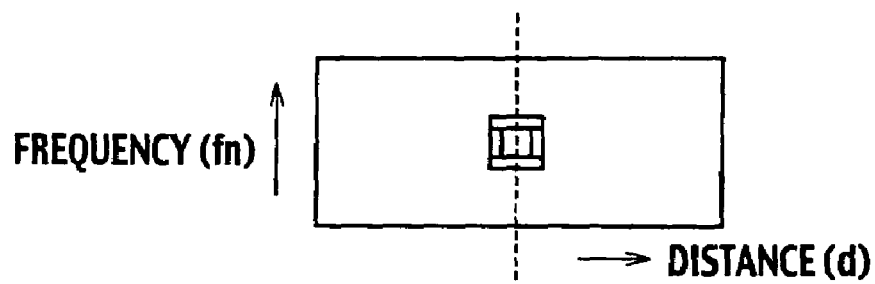
FIG. 5A is a diagram showing a result of a frequency analysis in relation to a target which is relatively moving after the resampling process in the radar system according to the first embodiment of the present invention.
Figure 5B:
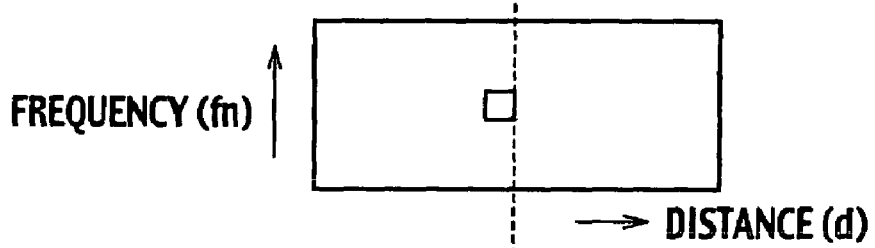
FIGS. 5B to 5D are diagrams showing a result of a time-frequency analysis in relation to the target which is relatively moving after the resampling process.
Figure 5C:
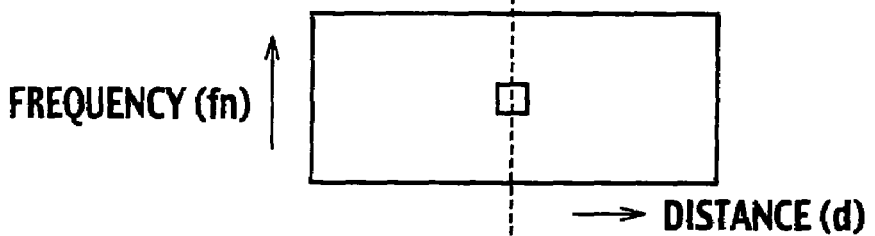
Figure 5D:
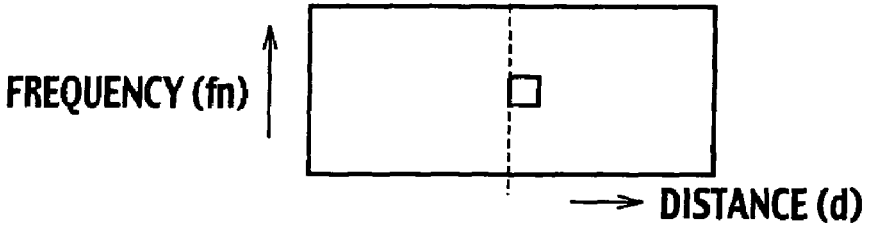

FIG. 5A shows a result of the frequency analysis of a target which relatively moves after the resampling process, and is formed based on a pulse train of k pulses obtained as the received signal in an observation time. FIGS. 5B to 5D show results of the time-frequency analysis of the target which relatively moves after the resampling process. FIG. 5B is formed based on k/2 pulses in the first half of the pulse train of k pulses obtained as the received signal in the observation time. FIG. 5C is formed based on k/2 pulses in the center of the pulse train of k pulses. FIG. 5D is formed based on k/2 pulses in the last half of the pulse train of k pulses.

In FIGS. 5B to 5D, it is understood that the target appears in more distant position as time passes. In FIGS. 4 and 5, a horizontal axis shows distance and this distance corresponds to a pulse repetition interval(PRI).

It should be noted that in the time-frequency analysis in this first embodiment, it is shown an example that the received signal obtained in the observation time is divided into three time zones to detect the position of the target. The number of the divided time zones, however, is not limited to three, but it may be arbitrarily determined.

As is understood from the results of the frequency analysis shown in FIGS. 4A and 5A, a difference between the target which is not relatively moving and the target which is relatively moving is small. On the contrary, as is understood from the results of the time-frequency analysis shown in FIGS. 4B to 4D and FIGS. 5B to 5D, the target which is not relatively moving appears in approximately the same position in the divided three time zones. The target which is relatively moving appears in different positions in the divided three time zones. Accordingly, after the resampling process, it can be determined whether or not the target is relatively moving.

In other words, in the present invention, the received signal is represented by distance, time, and frequency at the same time to detect the target based on temporal alteration of the signal in terms of the distance and the frequency.

In general, the time-frequency analysis is used for an analysis of an unsteady signal in which frequency changes over time. Even when distance (position) changes and the frequency does not change over time, the time-frequency analysis is performed by each distance to focus attention on the temporal alteration of the signal in terms of the distance and the frequency. Accordingly, it is attainable to calculate the presence/absence of movement of the target and moving speed of the target.

It should be noted that the above-described radar system according to the first embodiment of the present invention is provided with the resampling process unit 8 for correcting the movement of the target so as to be applicable when the moving speed of the target is large. However, in the radar system for acquiring, detecting, and tracking a target with large signal strength, it is not needed to correct the movement of the target. Therefore, such a radar system can be configured in a way where the resampling process unit 8 is omitted, and an outputted signal from the AD conversion unit 5 can be directly transmitted to the frequency analysis unit 6 and the time-frequency analysis unit 9.

In addition, the radar system can be configured in a way where the frequency analysis unit 6 is omitted from the above-described radar system according to the first embodiment of the present invention and a target detecting processing is performed by using only the outputted signal from the time-frequency analysis unit 9. With this configuration, the SN ratio is deteriorated by removing the frequency analysis unit 6, but the radar system can be simplified.

In addition, the radar system according to the first embodiment of the present invention can be configured in a way where pulse compression is performed by receiving a long pulse signal reflected with the target and by processing the signal, and pulse compression processing is performed in order to obtain a desired short pulse signal. In this case, it is desirable that the pulse compression processing unit for performing the pulse compression processing is provided between the AD conversion unit 5 and the resampling process unit 8 from a viewpoint of reducing a processing load.

Second Embodiment

A radar system according to a second embodiment of the present invention is characterized by performing resampling process in accordance with a resampling parameter determined based on a state vector of a target. A configuration of the radar system according to the second embodiment is equal to that of the radar system according to the first embodiment.

Now, a state vector X of a target is represented as follows:

$$X = \begin{bmatrix} x \\ x' \end{bmatrix} \quad (1)$$

where x is position and x' is speed.

In addition, transmission time T(n) of the n-th pulse of the transmitted signals is represented as follows:

$$T(n) = T_0 + \Delta T(n-1) \quad (2)$$

where $T_0$ is an elapsed time from a previous observation time and $\Delta T$ is a time interval of the transmitted pulses.

When a motion model of the target is that the target moves at constant speed, a target position y(n) of the n-th pulse of the transmitted signals is represented as follows:

$$y(n) = \begin{bmatrix} 1 & 0 \end{bmatrix} \begin{bmatrix} 1 & T(n) \\ 0 & 1 \end{bmatrix} \begin{bmatrix} x \\ x' \end{bmatrix} \quad (3)$$

Here, a target movement y'(n), which is based on the first pulse of the transmitted signals, is represented as follows:

$$y'(n) = y(n) - y(1) \quad (4)$$

In the resampling process unit 8, a resampling parameter is determined from the target movement y'(n) which is based on the first pulse of the transmitted signals, and the resampling process, in which a reference numeral of this target movement y'(n) is inverted, is performed so that the movement of the target can be corrected.

It should be noted that, the description has been given for a case where the motion model of the target is that the target moves at constant speed, but a motion model of the target can be arbitrarily set without limiting to the case where the target moves at constant speed.

The radar system according to the second embodiment is optimum as a configuration of an acquisition radar system for a small and fast target of which a state vector is obtained in advance or can be externally obtained, or of a multifunction radar system when a small and fast target is acquired.

Third Embodiment

A radar system according to a third embodiment of the present invention is characterized in that an outputted signal from the AD conversion unit 5 in the radar system according to the first embodiment is parallel-processed.

Figure 6:
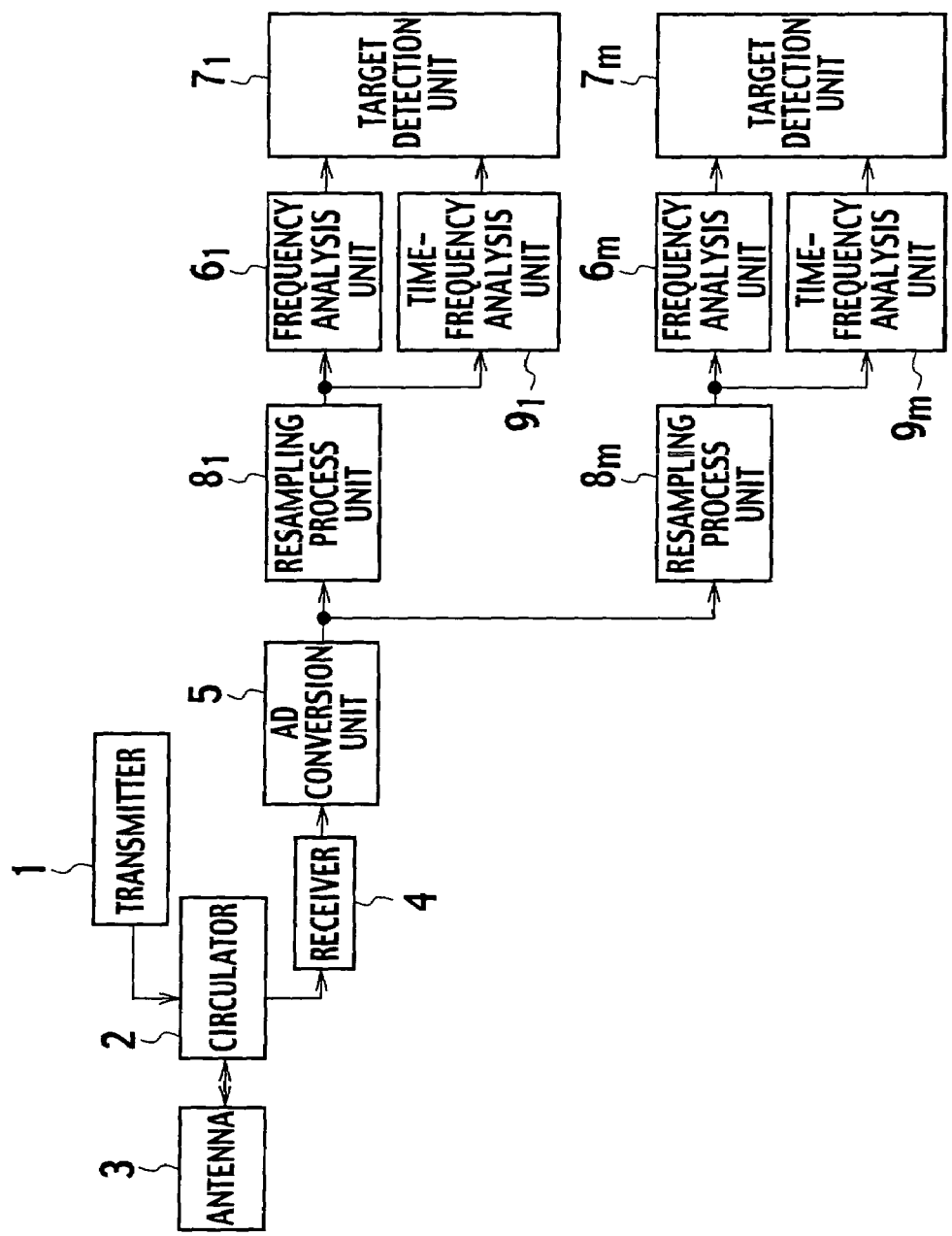
FIG. 6 is a block diagram showing a configuration of a radar system according to a third embodiment of the present invention.

FIG. 6 is a block diagram showing a configuration of the radar system according to the third embodiment of the present invention. In this radar system, the resampling process unit 8 of the radar system according to the first embodiment is replaced by m (m is integer of 2 and above) resampling process units $8_1$ to $8_m$. The frequency analysis unit 6 is replaced by m frequency analysis units $6_1$ to $6_m$. The time-frequency analysis unit 9 is replaced by m time-frequency analysis units $9_1$ to $9_m$. The target detection unit 7 is replaced by m target detection units $7_1$ to $7_m$. In this radar system, one system is formed by components having the same suffix. Therefore, this radar system has a radar system of m systems.

The AD conversion unit 5 converts an analog received signal, which is transmitted from the receiver 4, into a digital received signal, and transmits it to the m resampling process units $8_1$ to $8_m$. Each of the m resampling process units $8_1$ to $8_m$ performs resampling process in accordance with resampling parameters corresponding to various state vectors of the target. The resampling process units $8_i$ (i=1, 2, . . . , and m, and it is the same in the following) resamples the digital signals, which are transmitted from the AD conversion unit 5, and transmits signals indicating resampled results to the frequency analysis units $6_i$ and the time-frequency analysis units $9_i$.

The resampling process units $6_i$ perform frequency analyses of the signals, which are transmitted from the resampling process units $8_i$. The signals indicating the results of the frequency analyses in these frequency analysis units $6_i$ are transmitted to the target detection units $7_i$. The time-frequency analysis units $9_i$ perform time-frequency analyses of the signals, which are transmitted from the resampling process units $8_i$. The signals indicating the results of the time-frequency analyses in this time-frequency analysis units $9_i$ are transmitted to the target detection units $7_i$.

The target detection units $7_i$ detect the target based on the signals, which are transmitted from the frequency analysis units $6_i$, and the signals, which are transmitted from the time-frequency analysis units $9_i$.

The radar system according to the third embodiment is optimum as a configuration of a search radar system for a small and fast target of which a state vector cannot be obtained in advance, or of a multifunction radar device when a small and fast target is searched.

Fourth Embodiment

A radar system according to a fourth embodiment of the present invention is characterized in that an outputted signal from the AD conversion unit 5 of the radar system according to the first embodiment is processed in a time sharing manner.

Figure 7:
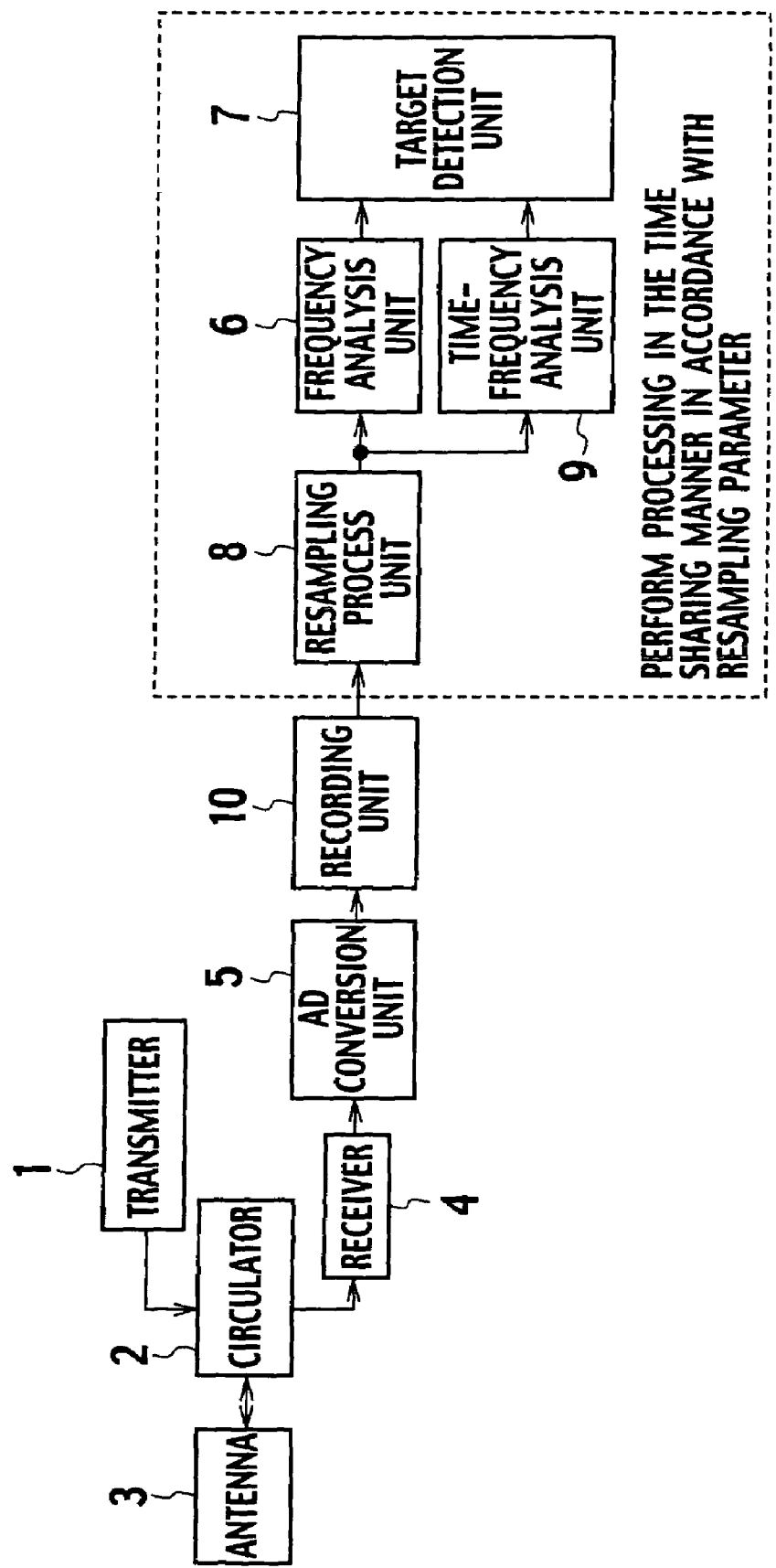
FIG. 7 is a block diagram showing a configuration of a radar system according to a fourth embodiment of the present invention.

FIG. 7 is a block diagram showing a configuration of the radar system according to the fourth embodiment of the present invention. This radar system is configured by adding a recording unit 10 to the radar system according to the first embodiment. In addition, each of the resampling process unit 8, the frequency analysis unit 6, the time-frequency analysis unit 9, and the target detection unit 7 performs processing in the time sharing manner in accordance with a plurality of resampling parameters respectively corresponding to a plurality of state vectors.

In this radar system, the AD conversion unit 5 converts the analog received signal, which is transmitted from the receiver 4, into the digital received signal, and transmits it to the recording unit 10. The recording unit 10 once records the received signal which is transmitted from the AD conversion unit 5, reads out a predetermined received signal every time the resampling parameter is changed, and transmits it to the resampling process unit 8. With this, every time the resampling parameter is changed, the processing similar to that of the above-described radar according to the first embodiment is performed.

The radar system according to the fourth embodiment is optimum as a configuration of a search radar system for a small and fast target of which a state vector of the target cannot be obtained in advance, or of a multifunction radar system when a small and fast target is searched.

Fifth Embodiment

A radar system according to a fifth embodiment of the present invention is characterized in that a state vector of a target is obtained from information in regard to tracking control.

Figure 8:
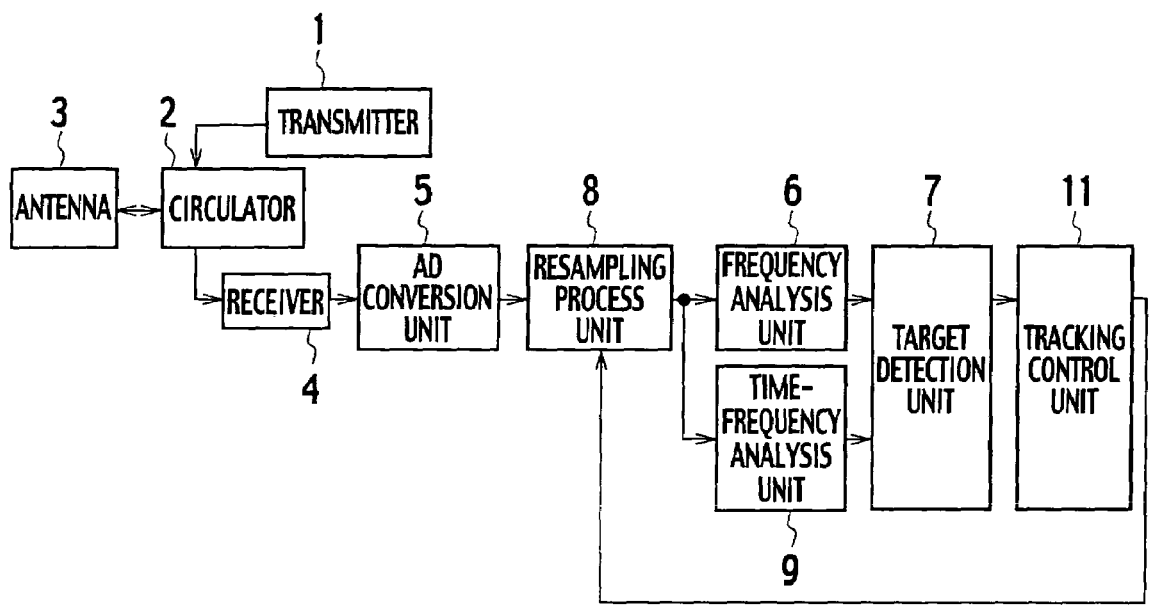
FIG. 8 is a block diagram showing a configuration of a radar system according to a fifth embodiment of the present invention.

FIG. 8 is a block diagram showing a configuration of the radar system according to the fifth embodiment of the present invention. This radar system is configured by adding a tracking control unit 11 to the radar system according to the first embodiment.

The tracking control unit 11 obtains a state vector of the target by performing tracking processing of the target by use of an outputted signal from the target detection unit 7. In addition, the tracking control unit 11 transmits the state vector of the target to the resampling process unit 8. The resampling process unit 8 determines a resampling parameter based on the state vector of the target from the tracking control unit 11, and performs resampling of the outputted signal from the AD conversion unit 5 in accordance with the determined resampling parameter. The outputted signal from this resampling process unit 8 is transmitted to the frequency analysis unit 6 and the time-frequency analysis unit 9. The operation of each of the frequency analysis unit 6, the time-frequency analysis unit 9, and the target detection unit 7 is the same as that of the above-described radar system according to the first embodiment.

The radar system according to the fifth embodiment is optimum as a configuration of a tracking radar system for a small and fast target of which a state vector of the target from the tracking control unit 11 can be output, or of a multifunction radar system when a small and fast target is tracked.

Sixth Embodiment

A radar system according to a sixth embodiment of the present invention is characterized in that the resampling process performed in the resampling process unit 8 of the radar system according to the first embodiment is performed by divided into resampling process within a range cell and resampling process at each range cell.

Figure 9:
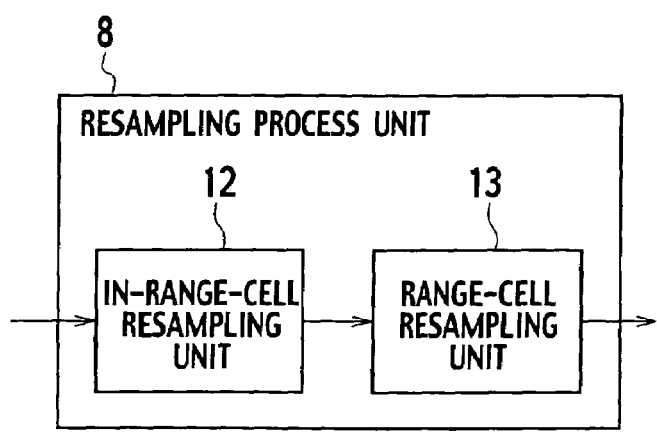
FIG. 9 is a block diagram showing a configuration of a resampling process unit in a radar system according to a sixth embodiment of the present invention.

FIG. 9 is a block diagram showing a configuration of the resampling process unit 8 of the radar system according to the sixth embodiment of the present invention. This resampling process unit 8 is configured with an in-range-cell resampling process unit 12 and a range-cell resampling process unit 13.

The in-range-cell resampling process unit 12 performs resampling of a signal, which is transmitted from the AD conversion unit, within a range cell, which is a cell in a range direction (distance direction). More specifically, the in-range-cell resampling process unit 12 performs an interpolation processing of the cell obtained by sampling, in accordance with a sampling theorem. Thereafter the in-range-cell resampling process unit 12 performs processing to restore the signal of a position in the range direction which has not been sampled. The outputted signal from the in-range-cell resampling process unit 12 is transmitted to the range-cell resampling process unit 13.

The range-cell resampling process unit 13 performs resampling of the signal from the in-range-cell resampling process unit 12 by each range cell as one unit. The outputted signal from the range-cell resampling process unit 13 is transmitted to the frequency analysis unit 6 and the time-frequency analysis unit 9.

The above-described radar system according to the sixth embodiment performs resampling process by dividing into the resampling process within a range cell and the resampling process at each range cell. Accordingly, regardless of a sampling amount, the number of samplings can be set constant, that is, a processing load can be set constant.

Seventh Embodiment

A radar system according to a seventh embodiment of the present invention is characterized in that the target detection unit 7 estimates a state vector of a target by use of a outputted signal from the time-frequency analysis unit 9. The configuration of this radar system according to the seventh embodiment is the same as that of the radar system according to the first embodiment except contents of processing performed in the target detection unit 7 and the resampling process unit 8.

The target detection unit 7 calculates a position of the target by every divided time zone by use of the result of the time-frequency analysis transmitted from the time-frequency analysis unit 9. Then, by using the calculated target position, the target detection unit 7 performs fitting process for a constant motion model or a constant acceleration motion model, in, for example, a least square method. Accordingly, the target detection unit 7 estimates the state vector of the target in the observation time. The state vector of the target estimated in this target detection unit 7 is transmitted to the resampling process unit 8.

The resampling process unit 8 determines a resampling parameter based on the state vector of the target, which is transmitted from the target detection unit 7, and performs resampling of the outputted signal from the AD conversion unit 5 in accordance with the determined resampling parameter. The outputted signal from this resampling process unit 8 is transmitted to the frequency analysis unit 6 and the time-frequency analysis unit 9. The operation of each of the frequency analysis unit 6, the time-frequency analysis unit 9, and the target detection unit 7 is the same as that of the above-described radar system according to the first embodiment.

It should be noted that a motion model used for the fitting process may be arbitrarily set. This radar system can perform the fitting process for a plurality of motion models, and use the motion model with the least fitting errors and the estimated state vector.

It should be noted that the radar system can be configured to estimate a state vector in an observation time with a combination of not only the target position by every divided time zone, but also frequency information.

Further, this radar system can calculate movement of the distance and the frequency between the divided time zones in a gradient method or a matching method used for video processing. Thereafter, the calculated movement is used for fitting processing to the constant motion model or the constant acceleration motion model.

A state vector of a target is generally calculated by using information regarding the target by every observation. In this radar system according to the seventh embodiment, the state vector of the target is calculated by using the information regarding the target in the observation time. Accordingly, the range correction can be performed more precisely, and the integration loss can be reduced.

Eighth Embodiment

A radar system according to an eighth embodiment of the present invention recursively performs processing for a target based on a state vector of the target estimated in the radar system according to the seventh embodiment.

Figure 10:
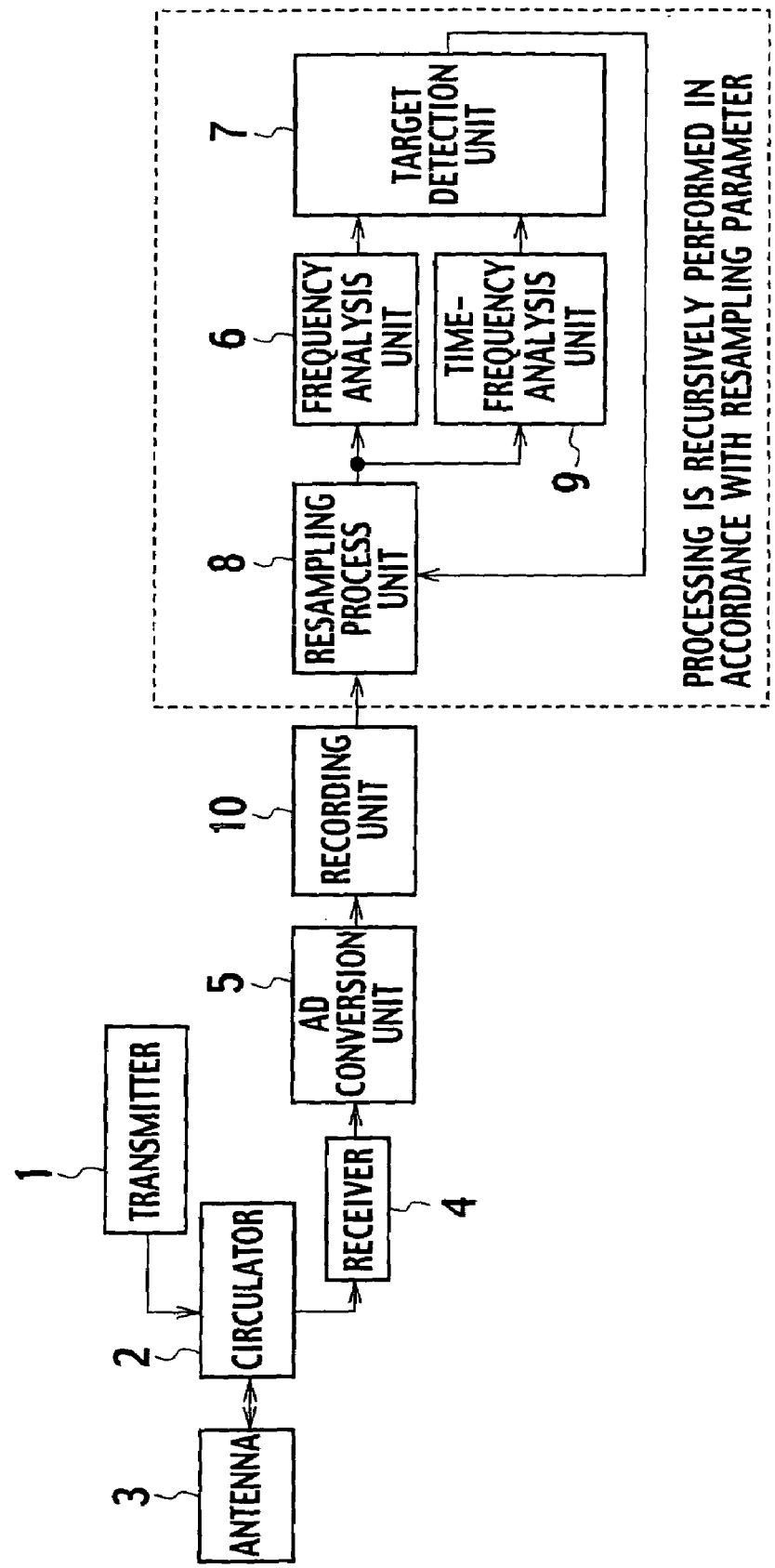
FIG. 10 is a block diagram showing a configuration of a radar system according to an eighth embodiment of the present invention.

FIG. 10 is a block diagram showing a configuration of the radar system according to the eighth embodiment of the present invention. In this radar system, similar to the seventh embodiment, the target detection unit 7 estimates the state vector of the target in the observation time based on the result of the time-frequency analysis transmitted from the time-frequency analysis unit 9. The state vector of the target estimated by this target detection unit 7 is transmitted to the resampling process unit 8.

The resampling process unit 8 determines a resampling parameter based on the estimated state vector of the target from the target detection unit 7, and performs resampling of the outputted signal from the AD conversion unit 5 in accordance with the determined resampling parameter. The outputted signal from this resampling process unit 8 is transmitted to the frequency analysis unit 6 and the time-frequency analysis unit 9. The operation of each of the frequency analysis unit 6, the time-frequency analysis unit 9, and the target detection unit 7 is the same as that of the above-described radar system according to the first embodiment. The above-described operation is recursively performed.

A state vector of a target is generally calculated by using information regarding a target by every observation. In the radar system according to the eighth embodiment, the state vector of the target is calculated by using information regarding the target in the observation time. Since the processing is recursively performed, the integration loss can be reduced even when the motion state of the target is greatly different from that in the previous time.

Ninth Embodiment

A radar system according to a ninth embodiment of the present invention performs detection of a target in the target detection unit 7 in the following manner. That is, the target detection unit 7 temporally detects the target by using a low threshold for the outputted signal from the frequency analysis unit 6. The target detection unit 7 finally detects the target by use of the outputted signal from the time-frequency analysis unit 9, which corresponds to a cell of the temporarily detected target. With this configuration, a processing load can be reduced.

Tenth Embodiment

A radar system according to a tenth embodiment of the present invention is characterized in that a resampling process is performed in accordance with a resampling parameter determined based on a relative state vector between the radar system and a target.

Figure 11:
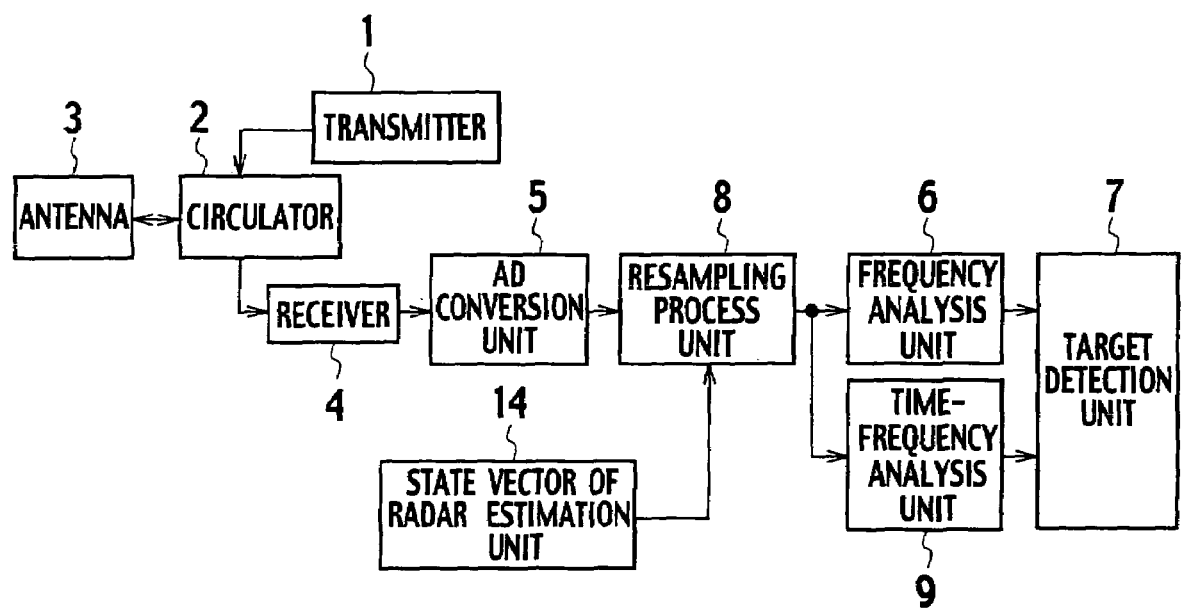
FIG. 11 is a block diagram showing a configuration of a radar system according to a tenth embodiment of the present invention.

FIG. 11 is a block diagram showing a configuration of the radar system according to the tenth embodiment of the present invention. In the block diagram showing the configuration of the radar system according to the tenth embodiment of the present invention, a state vector of a radar system estimation unit 14 is added to the configuration of the radar system according to the first embodiment.

Here, a state vector X1 of a target is represented as follows:

$$X1 = \begin{bmatrix} x1 \\ x1' \end{bmatrix}$$

where x1 is a position of the target and x1' is speed of the target. In addition, a state vector X2 of the radar system outputted from the state vector of a radar system estimation unit 14 of the on-board radar system is represented as follows:

$$X2 = \begin{bmatrix} x2 \\ x2' \end{bmatrix}$$

where x2 is a position of the radar system and x2' is speed of the radar system.

In the above case, a relative state vector ΔX between the radar system and the target is represented as follows:

$$\Delta X = \begin{bmatrix} \Delta x \\ \Delta x' \end{bmatrix} = \begin{bmatrix} x1 \\ x1' \end{bmatrix} - \begin{bmatrix} x2 \\ x2' \end{bmatrix}$$

In addition, a transmission time T(n) of the n-th pulse of the transmitted signals is represented as follows:

$$T(n) = T_0 + \Delta T(n-1)$$

where $T_0$ is an elapsed time from a previous observation time and ΔT is a time interval of the transmitted pulse.

When motion models of the target and the radar system are motion at constant speed, the target position y(n) of the n-th pulse of the transmitted signals is represented by a following equation.

$$y(n) = \begin{bmatrix} 1 & 0 \end{bmatrix} \begin{bmatrix} 1 & T(n) \\ 0 & 1 \end{bmatrix} \begin{bmatrix} \Delta x \\ \Delta x' \end{bmatrix}$$

Here, a target movement y'(n) based on the first pulse of the transmitted signals is represented as follows:

$$y'(n) = y(n) - y(1)$$

The resampling process unit 8 determines a resampling parameter from the target movement y'(n) which is based on the first pulse of the transmitted signals, and corrects the movement of the target by performing a resampling process in which a reference numeral of this target movement y'(n) is inverted.

It should be noted that the description has been given for a case where the motion models of the target and the radar system are the motion at constant speed, but they can be arbitrarily set without limiting to the case where the motion models of the target and the radar system are the motion at constant speed.

The radar system according to the tenth embodiment is optimum for a configuration when a device on which the radar system is mounted is moving like an air craft and a vehicle such as an automobile.

In addition, it may be configured so that the resampling process is performed according to the resampling parameter determined based on the state vector of the radar system when the target is not moving.

Furthermore, the integration effect cannot be obtained for the target moving at high speed when the radar system is a usual resolution radar system. In the same way, the integral effect cannot be obtained when the radar system is a high resolution radar system and the radar system or the target moves at low speed.

For example, a moving speed of the device on which the radar system is mounted is not as high speed as it when the radar system is a high resolution radar system which is mounted on the vehicle such as the automobile searching a close range at high resolution. However, since the radar system is at high resolution, the integration effect cannot be obtained.

Therefore, the radar system according to the tenth embodiment is the high resolution radar system and is optimum for the configuration when the device on which the radar system is mounted or the target is moving at slow speed.

What is claimed is:
1. A radar system for detecting a target, comprising:
an AD conversion unit configured to convert an analog signal obtained from an antenna into a digital signal;
a resampling process unit configured to obtain a target movement from an n-th pulse of a plurality of transmitted signals;
said target movement being based on a first pulse of the plurality of transmitted signals from the antenna;
said resampling process unit configured to correct the target movement by performing a resampling in accordance with a resampling parameter determined based on the target movement, and in said resampling, a reference numeral of the target movement for the digital signal converted by the AD conversion unit is inverted;
a frequency analysis unit configured to perform a frequency analysis of a signal from the resampling process unit;

a time-frequency analysis unit configured to perform a time-frequency analysis of the signal from the resampling process unit; and a target detection unit configured to detect a target based on a signal of which the frequency analysis is performed by the frequency analysis unit and a signal of which the time-frequency analysis is performed by the time-frequency analysis unit.

2. The radar system according to claim 1, wherein the resampling process unit is configured to perform the resampling of the digital signal converted by the AD conversion unit in accordance with a resampling parameter determined based on the target movement obtained based on a state vector of the target.

3. The radar system according to claim 1, including a plurality of systems where each system is configured with the resampling process unit, the frequency analysis unit, the time-frequency analysis unit, and the target detection unit, wherein the plurality of systems are configured to perform processing of a plurality of state vectors in relation to the target in parallel.

4. The radar system according to claim 1, wherein the resampling process unit, the frequency analysis unit, the time-frequency analysis unit, and the target detection unit are configured to perform processing of a plurality of state vectors of the target in a time-sharing manner.

5. The radar system according to claim 1, further comprising:

a tracking control unit which tracks the target by use of a signal detected by the target detection unit, wherein the resampling process unit is configured to perform the resampling of the digital signal converted by the AD conversion unit in accordance with a resampling parameter determined based on the target movement obtained based on a state vector of the target tracked by the tracking control unit.

6. The radar system according to claim 1, wherein the resampling process unit is provided with an in-range-cell resampling process unit which performs the resampling of the digital signal converted by the AD conversion unit in a range cell and a range-cell resampling process unit which performs the resampling of an outputted signal from the in-range-cell resampling process unit by each range cell as one unit.

7. The radar system according to claim 1, wherein the target detection unit is configured to estimate a state vector of the target by use of the signal of which the time-frequency analysis is performed by the time-frequency analysis unit, and the resampling process unit is configured to perform a resampling of the digital data converted by the AD conversion unit in accordance with a resampling parameter determined based on the target movement obtained based on the state vector of the target which is estimated by the target detection unit.

8. The radar system according to claim 7, wherein the resampling process unit, the frequency analysis unit, the time-frequency analysis unit, and the target detection unit are configured to recursively perform processing for the target based on the state vector of the target which is estimated by the target detection unit.

9. The radar system according to claim 1, wherein the target detection unit is configured to perform temporal detection of the target by use of a low threshold for the signal of which the frequency analysis is performed by the frequency analysis unit, and is configured to perform final detection of the target by use of the signal from the time-frequency analysis unit, the signal corresponding to a cell of the temporarily detected target.

10. The radar system according to claim 1, wherein the frequency analysis unit is configured to perform a frequency analysis by Fourier transform, and the time-frequency analysis unit is configured to perform a time-frequency analysis by short-time Fourier transform.

11. The radar system according to claim 1, wherein the resampling process unit is configured to perform a resampling of the digital signal converted by the AD conversion unit in accordance with a resampling parameter determined based on a state vector of the radar system or a relative state vector between the radar system and the target.

12. A radar system for detecting a target, comprising:

an AD conversion unit configured to convert an analog signal obtained from an antenna into a digital signal;

a resampling process unit configured to obtain a target movement from an n-th pulse of a plurality of transmitted signals;

said target movement being based on a first pulse of the plurality of transmitted signals from the antenna;

said resampling process unit configured to correct the target movement by performing a resampling in accordance with a resampling parameter determined based on the target movement, and in said resampling, a reference numeral of the target movement for the digital signal converted by the AD conversion unit is inverted;

a time-frequency analysis unit configured to perform a time-frequency analysis of the signal from the resampling process unit; and a target detection unit the target based on a signal of which the time-frequency analysis is performed by the time-frequency analysis unit.

* * * * *